US009903341B2

(12) United States Patent
Molins Garralda et al.

(10) Patent No.: US 9,903,341 B2
(45) Date of Patent: Feb. 27, 2018

(54) CONTROL METHOD FOR A WIND TURBINE (71) Applicant: Acciona Windpower, S.A., Navarra (ES)

(72) Inventors: Carlos Molins Garralda, Navarra (ES); Alberto Garcia Barace, Navarra (ES); Jose Luis Laborda Rubio, Navarra (ES); Teresa Arlaban Gabeiras, Navarra (ES); Alejandro Gonzalez Murua, Navarra (ES); Jose Luis Aristegui Lantero, Navarra (ES); Jose Miguel Garcia Sayes, Navarra (ES); Miguel Nunez Polo, Navarra (ES)

(73) Assignee: Acciona Windpower, S.A. (ES)

(*) Notice: Subject to any disclaimer, the term of this patent is extended or adjusted under 35 U.S.C. 154(b) by 228 days.

(21) Appl. No.: 14/715,946

(22) Filed: May 19, 2015

(65) Prior Publication Data
US 2015/0337803 A1  Nov. 26, 2015

(30) Foreign Application Priority Data

May 20, 2014 (ES) .................................. 201430728

(51) Int. Cl.
*F03D 7/02* (2006.01)
*F03D 1/06* (2006.01)
*F03D 11/00* (2006.01)
*F03D 11/04* (2006.01)
*F03D 7/04* (2006.01)
(Continued)

(52) U.S. Cl.
CPC ............ *F03D 7/0224* (2013.01); *F03D 1/065* (2013.01); *F03D 7/024* (2013.01); *F03D 7/042* (2013.01); *F03D 13/20* (2016.05); *F03D 17/00* (2016.05); *F05B 2270/32* (2013.01); *F05B 2270/326* (2013.01); *F05B 2270/328* (2013.01); *F05B 2270/335* (2013.01); *Y02E 10/721* (2013.01); *Y02E 10/723* (2013.01)

(58) Field of Classification Search
CPC ...... F03D 1/065; F03D 11/04; F03D 11/0091; F03D 7/042; F03D 7/0224; F03D 7/024; F03D 13/20; F03D 17/00; F05B 2270/32; F05B 2270/326; F05B 2270/328; F05B 2270/335; Y02E 10/721; Y02E 10/723
See application file for complete search history.

(56) References Cited

U.S. PATENT DOCUMENTS

6,619,918 B1 * 9/2003 Rebsdorf .............. F03D 7/0224
                                                    416/1
7,160,083 B2 * 1/2007 Pierce .................. F03D 7/0204
                                                    415/118
(Continued)

*Primary Examiner* — Igor Kershteyn
(74) *Attorney, Agent, or Firm* — Hayes Soloway PC (57) ABSTRACT

Control method for a wind turbine which comprises the steps of obtaining a first signal regarding the azimuthal position for each blade, obtaining at least one signal indicative of wind speed, and calculating a blade pitch angle control term. The step of calculating the blade pitch angle control term comprises the use of at least one function dependent on the at least one signal indicative of wind speed and the at least one function dependent on the at least one signal indicative of wind speed includes an increasing piece within a range of wind speed values below a nominal wind speed.

20 Claims, 9 Drawing Sheets

(51) Int. Cl.
    *F03D 17/00*    (2016.01)
    *F03D 13/20*    (2016.01)

(56) References Cited

U.S. PATENT DOCUMENTS

| | | | |
|---|---|---|---|
| 7,939,961 B1* | 5/2011 | Bonnet | F03D 1/0608 |
| | | | 290/44 |
| 8,131,402 B2* | 3/2012 | Neumann | F03D 7/0288 |
| | | | 290/44 |
| 2007/0102939 A1* | 5/2007 | Stommel | F03D 7/0224 |
| | | | 290/55 |
| 2011/0074154 A1* | 3/2011 | Ormel | H02P 9/04 |
| | | | 290/44 |
| 2011/0135466 A1* | 6/2011 | Latorre | F03D 7/02 |
| | | | 416/1 |
| 2011/0140431 A1* | 6/2011 | Landa | F03D 7/0224 |
| | | | 290/44 |
| 2013/0045098 A1 | 2/2013 | Taylor | |
| 2014/0030090 A1* | 1/2014 | Kammer | F03D 17/00 |
| | | | 416/1 |
| 2014/0140844 A1* | 5/2014 | Slot | F03D 7/04 |
| | | | 416/1 |

* cited by examiner

CONTROL METHOD FOR A WIND TURBINE

OBJECT OF THE INVENTION

The present invention pertains to the technical field of control methods for wind turbines.

More specifically, a method is described for the cyclic pitch control of a wind turbine, whose aim is to increase the distance between the tip of the blade and the tower, reducing the loss of energy associated with this type of control.

BACKGROUND OF THE INVENTION

The current trend in the design of wind turbines is to increase the length of the blades in order to increase the annual power produced, by means of a compromise between lightness and rigidity. In turn, it is advantageous to have a single platform ("platform" should be understood to be the structural elements of the wind turbine; that is, the tower, the hub and the nacelle) of a single size appropriate for use with blades of different sizes, for different types of location, thus opening new markets to the product, optimising costs.

One of the greatest problems related to increasing the length of the blades while limiting their weight is the increase in flexibility of the same. Said flexibility in combination with an increase in wind speed causes an increase in the deflection of the blades in the direction of the wind. This means that for a windward-facing wind turbine (normal configuration), the tips of the blades are deflected towards the tower.

There exist a number of solutions to prevent the deflected blades from striking the tower, as should this occur, irreparable damage would be caused to both components. A common practice consists of designing the rotor shaft in such a way that it is not horizontal, but is set at an angle from the horizontal, to separate the tips of the blades from the tower when they pass in front of said tower while rotating. This angle is known as the "tilt angle". The greater said angle, the more flexible, and therefore lighter, the blades may be, having a positive impact on the weight of the remainder of the components and finally on the cost of the whole. However, the effective surface of the rotor is reduced.

Another possibility consists of the use of hubs with a greater coning angle. However, once again, this brings about a reduction in the area swept by the rotor perpendicular to the wind. These known possibilities imply a reduction in the annual energy production.

The wind regime where the possibility of impact of the tip coincides with the corner of the machine's power curve (8-13 m/s) where the thrust is greatest. In this regime, the blade's pitch angle is usually the one which achieves the greatest production possible, commonly called "fine pitch".

In wind turbines where the aim is to maximise production without any problem of impact between the tip of the blade and the tower, the thrust increases with the wind from its minimum value for connection until the wind turbine reaches its nominal power, the thrust reaching its maximum value in this regime and at blade pitch angles of approximately 0° (fine pitch). Once nominal power has been reached, the blade pitch angle is moved towards a featherd position to reduce energy capture and to maintain power at its nominal value, once again reducing the thrust.

As thrust is the main cause of blade flexion, it may be inferred that the deflection will be greatest close the wind regime of maximum thrust and at blade pitch angles close to fine pitch.

Methods for the collective control of blade pitch angle (to the same extent in all blades) to prevent the collision of the blade with the tower are known in the state of the art. To do this, in problematic wind regimes, i.e. the corner of the wind turbine's power curve (8-13 m/s), the pitch angle of the three blades is increased to avoid that, due to wind gusts, the blades flex excessively.

The greatest drawback of this control method lies in that it moves the three blades to positions which are not optimal from the aerodynamic point of view, resulting in a great loss of annual power.

In an attempt to solve this energy loss, strategies have been developed in the state of the art whereby the blade pitch angle is modified cyclically for each blade exclusively in a sector of rotation where the blade passes in front of the tower (azimuthal angles comprised within 90° and 270°).

This type of control corresponds to that revealed in document US2013045098, wherein a control method is described whose aim is to increase the distance between the tip of the blade and the tower. By means of this method, the blade pitch angle of the blade approaching the tower is controlled, moving it to an angle of lower power capture (i.e. the blade is feathered) when its azimuthal position is detected and it is close to the position where it passes by the tower.

The method described in said document also compensates for the loss of energy associated with the movement toward positive pitch angles of the blade approaching the tower, by turning the other two blades to face the wind more directly. This also enables a reduction in the associated power ripple. The problem is that this only works in nominal power regimes (in other regimes the pitch angle is already optimal, understood to be that which provides the maximum power capture) where there is surplus power.

Given that the minimum distance between the tip of the blade and the surface of the tower occurs when it passes at 180° from its azimuthal position, an additional blade pitch angle term is added, whose value depends on the azimuthal position of the blade and whose maximum value is reached when the blade passes the tower (in an azimuthal position corresponding to approximately 180°, the origin of the reference being the upwardly pointing vertical position of the blade).

DESCRIPTION OF THE INVENTION

The control method for wind turbines of the present invention enables an increase in the distance between the tip of the blade which passes by the generator tower and the tower itself, to prevent possible collisions. To this end, the control method includes the application of a blade pitch angle control term which is calculated as a function of at least one signal indicative of wind speed and as a function of the azimuthal angle of each blade.

The aim of the proposed control method is to reduce the energy loss associated with the blade angle pitch variation performed when said blades pass in front of the tower (azimuthal angle of 180°, taking the upwardly pointing vertical position of the blade as a reference). As has been described above, the pitch angle variation at this point is performed in order to prevent possible collisions between the tip of the blade and the wind turbine tower, and the present method enables a reduction in the associated energy loss.

It consists of a control method which minimises the energy loss caused by the movement of the blade toward positive pitch angles, comprising the application of a value for the additional term of the blade pitch angle dependent on a signal indicative of wind speed. Thus, a reduction in the energy loss associated with the imposition of a non-optimal angle is achieved.

During the operation of the wind turbine, the control function passes through a sub-nominal production regime and through a nominal production regime. In the sub-nominal production regime the wind turbine generates less power than the wind turbine's nominal power, and the nominal production regime is the regime where a power equal to the nominal power is produced.

The described method uses the following as a signal indicative of wind:
- the generated power in the sub-nominal production regime where there is possibility of collision between the blade and the tower, and
- the pitch angle in the nominal production regime where there is possibility of collision between the blade and the tower.

Therefore, the value of the pitch angle of each blade is controlled with regard to the possibility of the occurrence of a collision between the blade and the tower, in order to minimise the energy loss.

This probability of collision between the blade and the tower increases until nominal power; at this point generally starts the regulation of the power of the rotor by turning the blade to greater pitch angles (that is, toward feathered position), due to the fact that in said regime the thrust values are greater.

DESCRIPTION OF THE DRAWINGS

As a supplement to the description made herein, and for the purpose of aiding the better understanding of the characteristics of the invention, in accordance with a preferred example of a practical embodiment of the same, a set of drawings is attached as an integral part of said description wherein, by way of illustration and not limitation, the following is represented.

PREFERRED EMBODIMENT OF THE INVENTION

An example of an embodiment of the wind turbine control method of the present invention is presented below.

Figure 1:
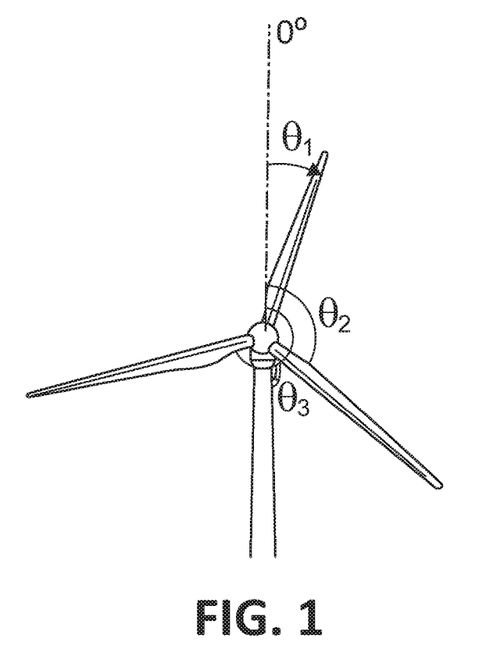
FIG. 1 shows a view of the positions of the wind turbine blades, depicting the azimuthal positions of the blades and the azimuthal angle reference corresponding to the upwardly pointing vertical position of the blade.

FIG. 1 shows a drawing in which the higher part of a wind turbine is represented. A rotor with three blades and the upper part of the tower may be seen. Said drawing depicts the azimuthal angles ($\theta$) representing the positions of each blade with respect to the reference azimuthal angle corresponding to the upwardly pointing vertical position of the blade.

Figure 2:
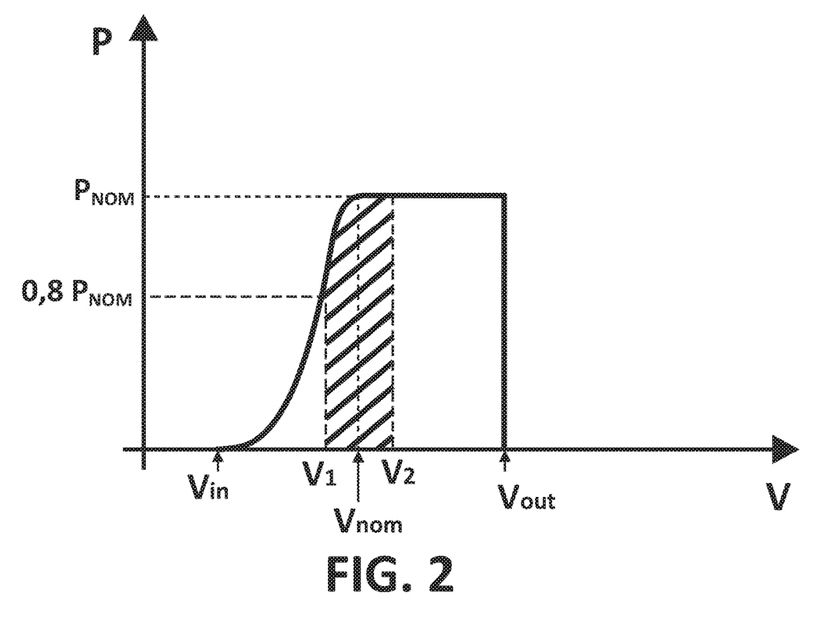
FIG. 2 shows a graph of the power vs. wind speed on which the regime with possibility of collision between blade and tower has been shaded.

FIG. 2 represents the generic power curve of a wind turbine, showing the generated power (P) as a function of wind speed (v). The initial point of the curve is determined by wind speed at which the generator starts to deliver power to the electrical grid ($v_{in}$), and the final point by wind speed at which the wind turbine is disconnected from the electrical grid so as not to be subjected to excessive mechanical loads ($v_{out}$).

The shaded area represents the area in which a risk of collision between the tip of the blade and the tower exists and which extends between a speed $v_1$ lower than the $v_{nom}$ and a speed $v_2$ greater than the $v_{nom}$. As may be observed in the graph, the shaded area covers part of the sub-nominal production regime and part of the nominal production regime. Said shaded area is the regime where the blade pitch angle control term ($\Delta\beta$) may have positive values, depending on the azimuthal position.

As has been described above, the maximum thrust is usually reached prior to get to nominal power ($P_{nom}$) but when this power is reached, the pitch angle ($\beta$) of the three blades (when the three move at the same time) starts to get positive values in order to control the speed of rotation and to maintain the power limited around nominal power, in such a way that thrust and flexion are reduced (the flexion is reduced as a consequence of the reduction in thrust). At this point, as the flexion has diminished, the probability of collision between blade and tower also diminishes, and it is therefore unnecessary to apply a term dependent on the azimuthal position of the blade to the pitch angle control function.

The proposed control method is intended to be used in a wind turbine of the type consisting of:
- a tower,
- a rotor with a plurality of blades, each comprising respective actuators, configured to modify the pitch angle of each blade, and
- a control unit.

Said method comprises the following steps:
- obtaining a first signal of the azimuthal position ($\theta$) of each blade, obtaining at least one signal indicative of wind speed (v) and calculating a blade pitch angle control term ($\Delta\beta$) for each blade as a function of the azimuthal position ($\theta$) of each blade and of the at least one signal indicative of wind speed (v), with the purpose of increasing the blade pitch angle ($\beta$).

Subsequently, the pitch angle control term ($\Delta\beta$) for each blade is sent to each blade for the respective actuators to modify the pitch angle, as a function of said control term.

In this way, by increasing the blade pitch angle ($\beta$) within a range of azimuthal blade positions between 90° and 270°, an increase in distance between the tip of the blade and the tower is achieved, thus preventing potential collisions between the blade and the tower.

On the other hand, if the range of azimuthal positions where the blade pitch angle ($\beta$) increases is between 270° and 90°, the wind turbine is protected against extreme loads in the event of a sudden variation in wind shear profile.

The key of the proposed method is that the stage of calculating the blade pitch angle control term ($\Delta\beta$) comprises the use of at least one function dependent on the at least one signal indicative of wind speed (v) and because the at least one function dependent on the at least one signal indicative of wind speed comprises an increasing piece within a range of wind values below a nominal wind speed ($v_{nom}$). The at least one function dependent on the at least one signal indicative of wind speed includes a decreasing piece within a range of wind values above a nominal wind speed.

As may be seen in FIG. 2, the shaded area is that in which a value different from zero is applied for the blade pitch angle control term ($\Delta\beta$) (this value will be positive in wind turbines with the blade pitch control at the feathering position). As it depends on the azimuthal position ($\theta$) and assumes non-null values within a range of azimuthal positions close to the angle corresponding to the blade passing in front of the tower (i.e. between 90° and 270°, according to the references in FIG. 1), and null values within a range of azimuthal positions distant from the blade pitch angle in front of the tower (i.e. between 270° and 90°, according to the references in FIG. 1), the function is cyclic, as the blade pitch control term value changes as a result of the variation of the blade azimuthal position due to the rotation of the rotor.

Generally, the use of wind measurements is unadvisable as they are affected by the passage of the blade in front of the anemometer and they are instantaneous and thus they comprise considerable noise. In order to prevent these drawbacks, the at least one signal indicating wind speed comprises a filtered wind measurement. In an example of an embodiment, obtaining a filtered wind measurement may be achieved by taking the average of instantaneous wind measurements over a particular time interval, for example 5 s, 10 s, etc.

In an embodiment of the invention, the method uses the generated power as a signal indicative of wind speed in the sub-nominal production regime (for the range of wind speed values below a nominal wind speed). In this embodiment, the at least one signal indicative of wind speed comprises a measurement of generated power (P) and the function used for the calculation of the blade pitch angle control term ($\Delta\beta$) is dependent on the generated power (P) and includes an increasing piece within a range of power values below the nominal power ($P_{nom}$).

Specifically, in an embodiment of the invention, the function used for the calculation of the blade pitch angle control term ($\Delta\beta$) is a cyclic function, with a period depending on the azimuthal position of the blade ($\theta$) and an amplitude (A) depending on the signal indicative of the wind (v), therefore A=A(v). Therefore, the function used for the calculation of the blade pitch angle control term is doubly dependent on the azimuthal position of the blade and on the signal indicative of the wind $\Delta\beta=\Delta\beta(\theta,v)$.

In one embodiment, said function is a sine function which assumes an expression of the type:

$$\Delta\beta=\Delta\beta(\theta,v)=A(v)*\sin(\theta-\pi/2)$$

Furthermore, it is a piecewise function which assumes the following expression, depending on the azimuthal position:

$$\Delta\beta=A(v)*\sin(\theta-\pi/2) \text{ for } \theta1<\theta<\theta2$$

$$\Delta\beta=0 \text{ for } \theta2<\theta<\theta1$$

Alternatively, the function may be a triangular or trapezoidal function or may be out-of-phase with regard to the position of the tower, as will be shown below.

As has been mentioned, it is used a function which is dependent on the at least one signal indicative of wind speed (v) for the calculation of a blade pitch angle control term value. In one embodiment, said function, defines the value of the amplitude (A) of the cyclic function as a function of the signal indicative of wind speed (v).

Figure 3:
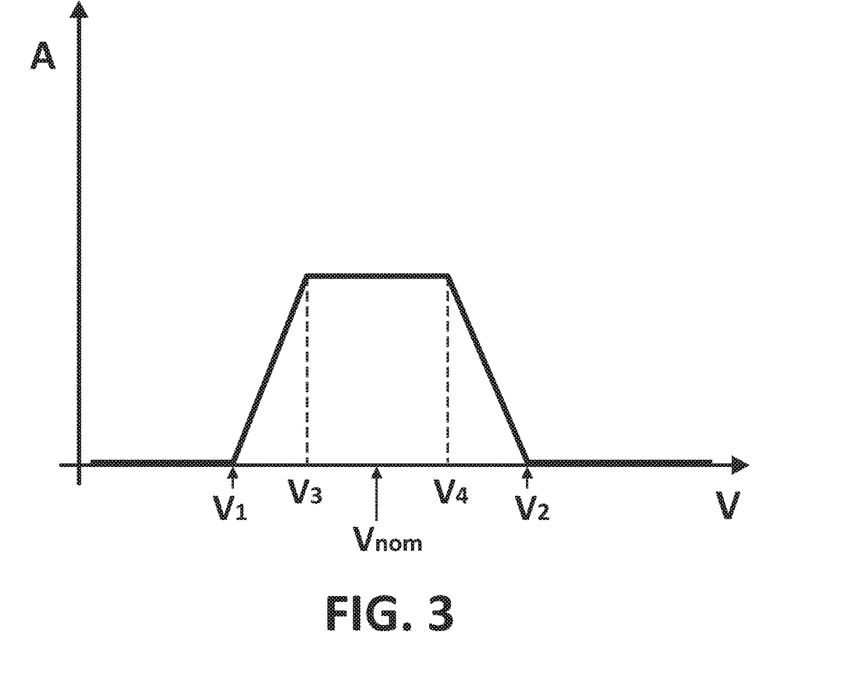
FIG. 3 shows a graph of the function governing the value of the blade pitch control term, to increase the distance between the tip of the blade and the tower, depending on the signal indicative of wind speed.

FIG. 3 shows a graph on which the function defines the value of the amplitude (A) of the cyclic function as a function of the signal indicative of wind speed (v) which, when applied to the cyclic function, will provide the value assumed by the blade pitch angle control term ($\Delta\beta$) as a function of wind speed, in order to increase the distance between the tip of the blade and the tower, in correspondence with the signal indicative of wind speed.

Said graph includes an increasing piece from $V_1$ to $V_3$, $V_1$ being speed lower than the nominal wind speed, and includes a decreasing piece from $V_4$ to $V_2$, $V_2$ being a speed greater than the nominal wind speed. That is to say that A=A(v), and specifically:

$$A=0 \text{ for } v<V1$$

$$A=A_{Max}(V_3-v)/(V_3-V_1) \text{ for } V_1<v<V_3 \text{ with } V_1<V_3<V_{Nom}$$

$$A=A_{Max} \text{ for } V_3<v<V_4 \text{ with } V_3<V_{Nom} \text{ and } V_4>V_{Nom}$$

$$A=A_{Max}-A_{Max}(v-V_4)/(V_2-V_4) \text{ for } V_4<v<V_2 \text{ with } V_4>V_{Nom}$$

$$A=0 \text{ for } v>V_2$$

As signals indicative of wind speed, the described method uses the following for the calculation of the amplitude (A) of the cyclic function, i.e. the function dependent on the at least one signal indicative of wind speed (v) for the calculation of a value of the blade pitch control term:

the generated power (P) in the sub-nominal production regime where there is possibility of collision between the blade and the tower, and the pitch angle ($\beta$) in the nominal production regime where there is possibility of collision between the blade and the tower.

Thus, in one embodiment, two functions are used for the calculation of the amplitude A applied to the cyclic function, one dependent on the power A(P), and the other dependent on the blade pitch angle A($\beta$).

Therefore, the function defining the value of the amplitude (A) of the cyclic function as a function of the signal indicative of wind (v) is doubly dependent on the generated power and on the blade pitch angle, in such a way that, in the sub-nominal power regime, i.e. below the nominal wind speed, the function depends on the generated power; and above the nominal wind speed, the function depends on the blade pitch angle (β).

$$A(P,\beta)=A(P) \text{ for } v<V_{Nom}$$

$$A(P,\beta)=A(\beta) \text{ for } v>V_{Nom}$$

In one embodiment of the invention, the signal indicative of wind is the generated power and the method comprises the following steps:
   obtaining a measurement of generated power (P),
   establishing a first value of generated power ($P_1$) and a second value of generated power ($P_2$), where the second value of generated power ($P_2$) is lower than the nominal power ($P_{nom}$) and the first value of generated power ($P_1$) is lower than the second value of generated power ($P_2$),
   calculating the blade pitch angle control term (Δβ) as a function of the measurement of generated power (P).

Figure 4:
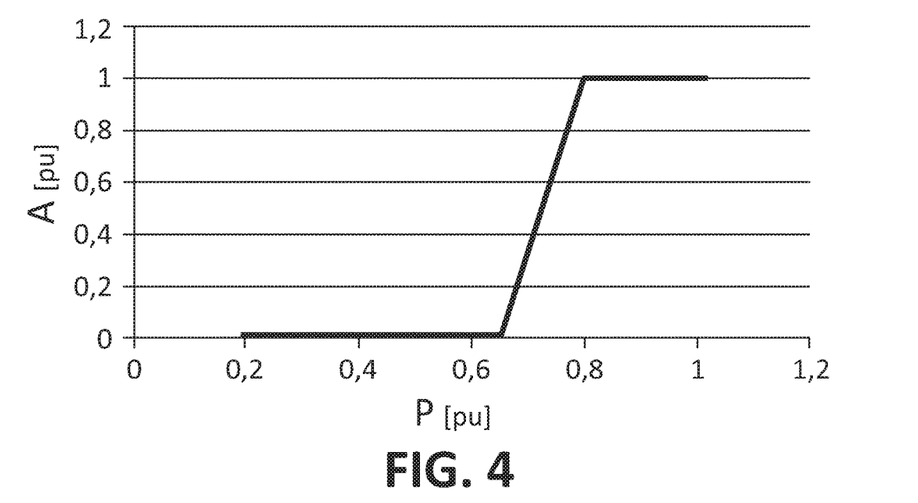
FIG. 4 shows a graph of the function governing the value of the blade pitch control term applied to the calculation of maximum amplitude, dependent on the power.

According to said embodiment, the increasing piece of the function to calculate the value of the blade pitch angle control term (Δβ) is comprised within the first value of generated power ($P_1$) and the second value of generated power ($P_2$), as may be seen in FIG. 4 for $P_1$=0.65 and $P_2$=0.8.

Said FIG. 4 shows a graph representing the value of the amplitude A as a function of power P. It depicts how below a threshold set by a first value of generated power $P_1$, the amplitude A of the function is null, and for a power value comprised within $P_1$ and $P_2$, ($P_2$ being a second value of generated power lower than the nominal power ($P_{nom}$) and the first value of generated power being lower than the second value of generated power ($P_1<P_2$)), the value of the amplitude increases until it reaches its maximum value $A_{Max}$ when the power is equal to $P_2$.

Specifically, in FIG. 4 the first value of generated power is equal to 0.65 of the nominal power of the wind turbine, and the second value of generated power is equal to 0.8 of the nominal power of the generator; i.e. $P_1$=0.65 and $P_2$=0.8. Thus, the function providing the value of the amplitude A is a piecewise function given by the following expression:

$$A=0 \text{ for } P<P_1 A=A(P)=A_{Max}(P_2-P)/(P_2-P_1) \text{ for } P_1<P<P_2 \text{ with } P_2<P_{nom}.$$

$$A=A(P)=A_{Max} P_2<P<P_{nom}$$

The maximum amplitude value $A_{max}$ is calculated to prevent collision of the blades in the most unfavourable case of thrust.

In said FIG. 4 an example of an embodiment is shown where the first value of generated power ($P_1$) is 0.65 pu and the second value of generated power ($P_2$) is 0.8 pu.

In an example of the method in which the at least one signal indicative of wind speed comprises a measurement of generated power (P), said method comprising the following steps:
   obtaining the measurement of generated power (P),
   establishing a first value of generated power ($P_1$) and a second value of generated power ($P_2$), where the second value of generated power ($P_2$) is lower than the nominal power ($P_{nom}$) and the first value of generated power ($P_1$) is lower than the second value of generated power ($P_2$),
   calculating the blade pitch angle control term (Δβ) using the at least one function dependent on the at least one signal indicative of wind speed (v), using the measurement of generated power (P) as the signal indicative of wind speed, and where the increasing piece of the at least one function dependent on the at least one signal indicative of wind speed is comprised within the first value of generated power ($P_1$) and the second value of generated power ($P_2$).

In another example of an embodiment of the invention, the blade pitch angle (β) is used as the signal indicative of wind speed in the nominal production regime for a range of wind speeds above a nominal wind speed. In this embodiment, the at least one signal indicative of wind speed comprises a measurement of the blade pitch angle (β).

Figure 5:
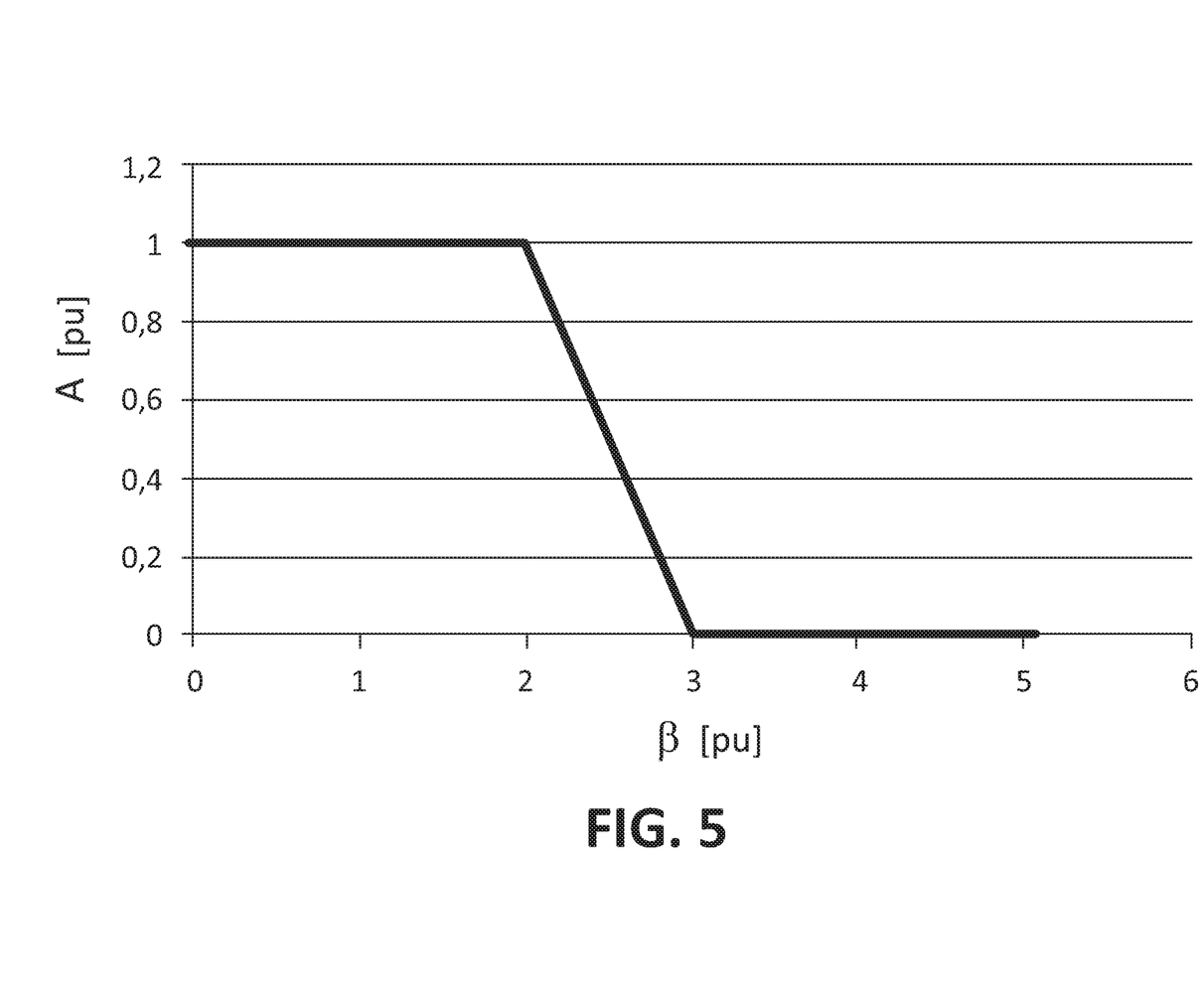
FIG. 5 shows a graph of the function governing the value of the blade pitch control term to increase the distance between the tip of the blade and the tower, for a minimum value of blade pitch equal to zero.

The value of the blade pitch angle control term (Δβ) is comprised, as may be seen in FIG. 5, within the following values:
   If the measured blade pitch angle (β) is lower than the minimum blade pitch angle ($\beta_{min}$) plus a first safety threshold, then the amplitude of the wind turbine blade pitch angle control term is maximum.
   If the measured blade pitch angle (β) is greater than the minimum blade pitch angle ($\beta_{min}$) plus a first safety threshold and lower than the minimum blade pitch angle ($\beta_{min}$) plus a second threshold greater than the first safety threshold, then the amplitude A is lower than the maximum amplitude $A_{max}$ of the blade pitch angle control term.
   If the measured blade pitch angle (β) is greater than the minimum blade pitch angle ($\beta_{min}$) plus the value of the blade pitch angle control term (Δβ) and the second safety threshold, then the amplitude of the blade pitch angle control term is null. Said FIG. 5 shows an example of an embodiment of the function applied to the calculation of the value of the amplitude A which is dependent on the blade pitch angle A(β). It shows an example taking a minimum blade pitch angle ($\beta_{min}$) equal to zero, a first safety value equal to 2° and a second safety value equal to 3°, the function employed for the calculation of the amplitude A used in the function for the calculation of the blade pitch angle control term (Δβ) being a linear function A(β) and those of the resulting amplitude varying within 0 and $A_{Max}$ with $A_{Max}$=1.

Therefore, the method may further comprise the following steps:
   obtaining the measurement of the blade pitch angle (β),
   establishing a minimum blade pitch angle ($\beta_{min}$), a first safety value and a second safety value,
   calculating the blade pitch angle control term (Δβ), using the at least one function dependent on the at least one signal indicative of wind speed (v), using the measurement of the blade pitch angle (β) as a signal indicative of the wind; and where the at least one function dependent on the at least one signal indicative of wind speed comprises a decreasing piece within a range of blade pitch angle (β) values, comprised within the minimum blade pitch angle ($\beta_{min}$) plus the first safety value and the minimum blade pitch angle ($\beta_{min}$) plus the second safety value.

In an example of an embodiment of the invention, the step of calculating the blade pitch angle control term (Δβ), using the at least one function dependent on the at least one signal indicative of wind speed (v), is performed using the measurement of the blade pitch angle (β) as the signal indicative of the wind when the signal indicative of wind speed is within the range of wind speed values above the nominal wind speed ($v_{nom}$). This step is performed using the measurement of generated power (P) as the signal indicative of wind speed, when the signal indicative of wind speed is within the range of wind speed values below the nominal wind speed ($v_{nom}$).

In another example of an embodiment, the range of azimuthal values (ΔT) in which the blade pitch angle control term (Δβ) assumes non-null values depends on the signal indicative of wind speed, being possible to use a filtered measurement of wind speed, the generated power, the blade pitch angle or the value of the amplitude (A) given by the function dependent on the signal indicative of the wind. An example of said variable gain applied to the period of the cyclic function is depicted in FIG. 6, where the variable gain depends on the power to the amplitude of the function regulating the value of the blade pitch angle.

Figure 6:
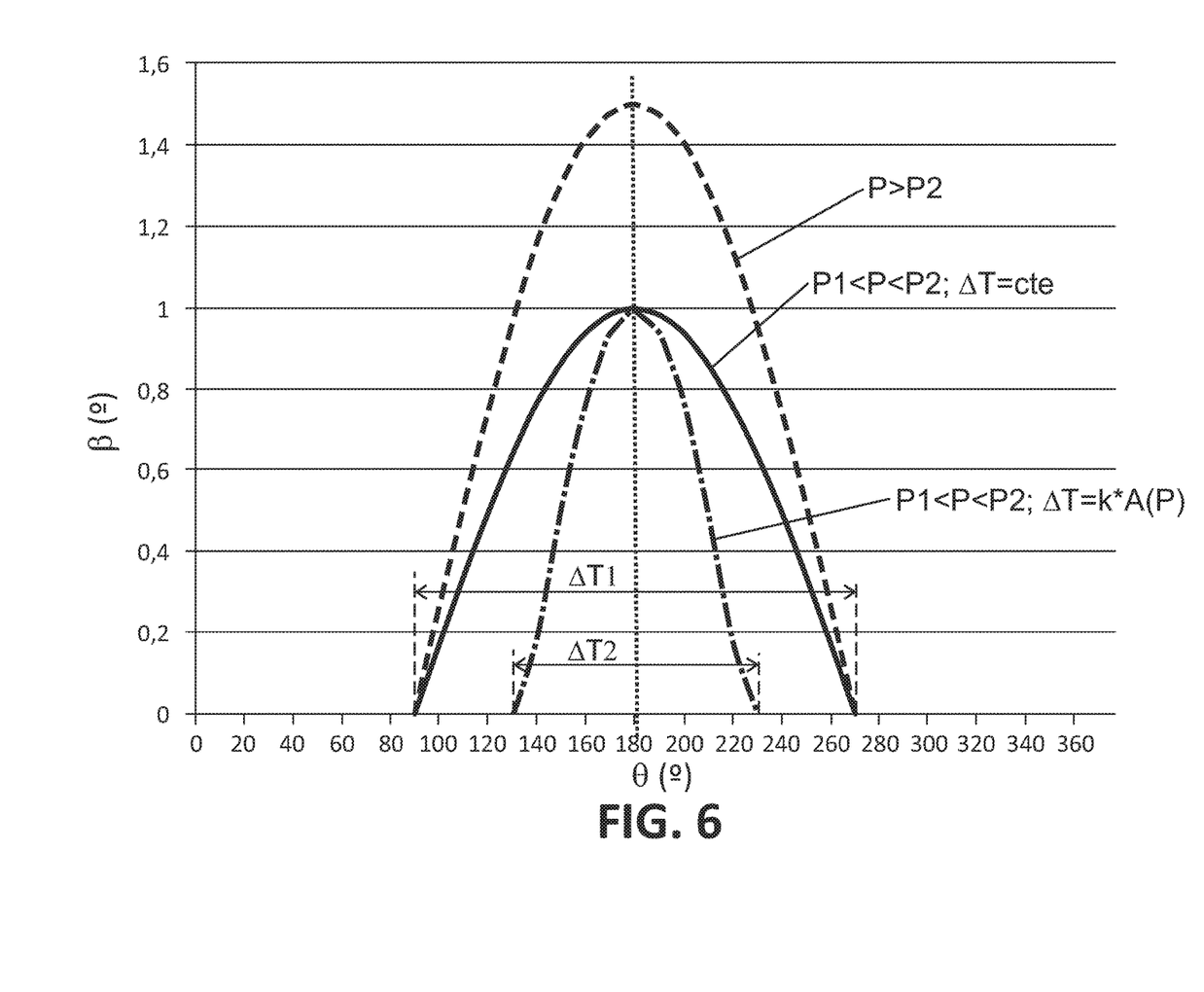
FIG. 6 shows a graph depicting two examples of applying a variable gain dependent on the amplitude of the function regulating the value of the blade pitch term; it may be seen that the range of azimuthal positions where the blade pitch control term is non-null depends on the maximum amplitude as a function of the signal.

The graph in FIG. 6 shows the curve corresponding to the control function when the power is greater than $P_2$, and the curve when the power is comprised within $P_1$ and $P_2$ (as it has been described above, the function has a null amplitude when the power is lower than $P_1$).

Furthermore, in order to increase production, it is proposed that the range of azimuthal positions (ΔT) in which the blade pitch angle control term is non-null is dependent on the amplitude determined as a function of the signal indicative of the wind (it may, for example, be proportional to the amplitude), i.e. ΔT=K*A(P), where K is a proportionality constant. This enables a reduction in energy loss maintaining the maximum blade pitch angle speed determined to reach maximum amplitude in the time available (depending on the rotational speed). FIG. 6 shows the range of azimuthal positions (ΔT) in which the blade pitch angle control term is non-null.

In an example of an embodiment of the invention, the range of azimuthal positions (ΔT) in which the blade pitch angle control term is non-null is dependent on the amplitude (A) calculated using the at least one function dependent on the at least one signal indicative of wind speed (v).

In one of the graphs (dotted line) where the value of the blade pitch angle control term is shown for a power comprised within P1 and P2, it may be seen how the range of azimuthal positions ($\Delta T_2$) in which the blade pitch angle control term is non-null coincides with the range of azimuthal positions ($\Delta T_2$) in which the blade pitch angle control term is non-null for a power equal to P2 (i.e. with an amplitude equal to maximum amplitude).

However, the dashed line shows the value of the blade pitch angle control term in accordance with an embodiment where the range of azimuthal positions (ΔT) in which the blade pitch angle control term is non-null is dependent on the amplitude determined as a function of the signal indicative of the wind (for example, it may be proportional to the amplitude), i.e. $\Delta T = K*A(P) = \Delta T_2 < \Delta T_1$.

Figure 7:
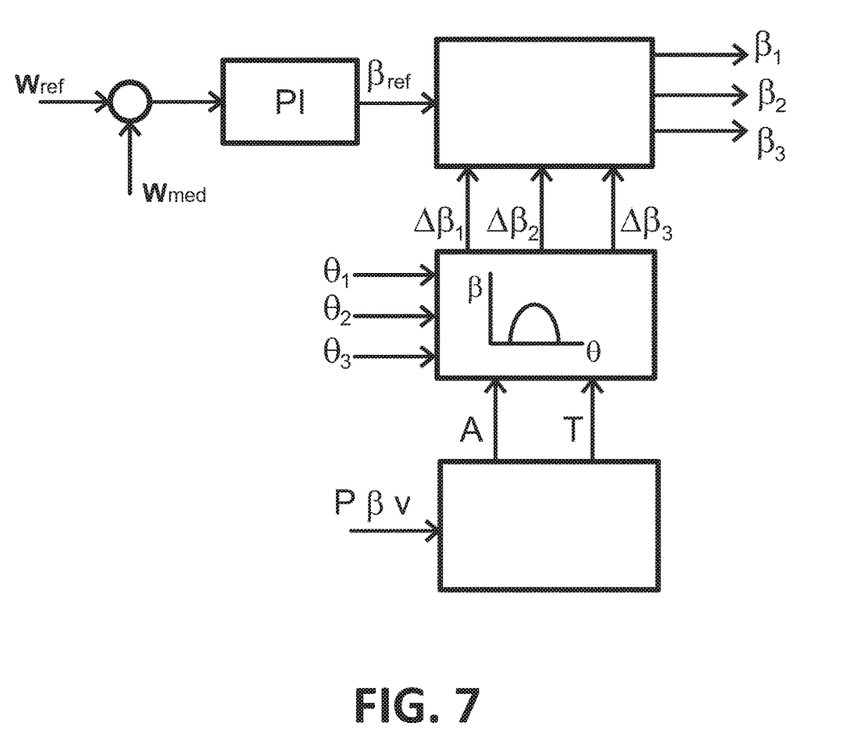
FIG. 7 shows a schematic view of the block diagram implemented in the generator control unit in order to carry out the control method.

FIG. 7 shows the block diagram implemented in the wind turbine control unit in order to carry out the method described. The setpoint of the blade pitch angle dependent on the difference comprised within the reference rotational speed of the rotor and the speed measured, which is common for the three blades ($\beta_{ref}$), is added to respective terms calculated individually for each blade as a function of the calculations described above, and which depend on the azimuthal position of each blade and on wind speed.

Figure 8:
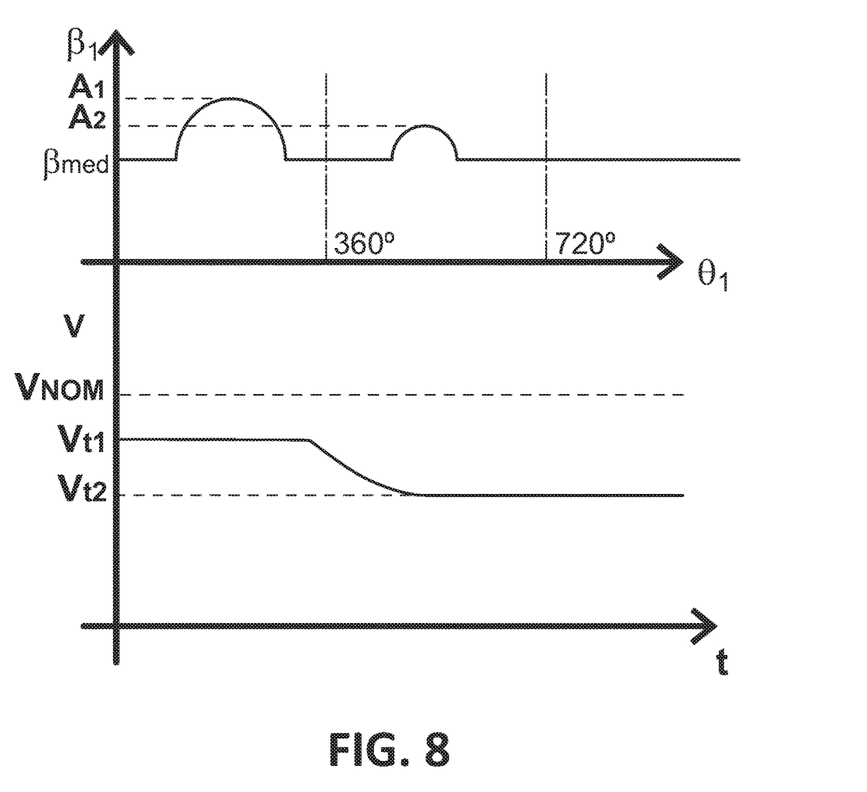
FIG. 8 shows two graphs depicting the value of the blade pitch angle and wind speed; the amplitude of the pitch angle control term applied is reduced as wind speed diminishes.

As may be seen in the aforementioned FIG. 7, the final reference result of the blade pitch angle (β) for each blade is:

$\beta_1 = \beta_{ref} + \Delta\beta_1$ $\beta_2 = \beta_{ref} + \Delta\beta_2$ $\beta_3 = \beta_{ref} + \Delta\beta_3$ As may be seen in FIG. 8, the value of the blade pitch angle of a blade varies in accordance with wind speed in such a way that the amplitude of the additional term applied to the average value decreases as wind speed decreases ($A_1 > A_2$).

In an embodiment of the invention the step of calculating a blade pitch angle control term (Δβ) for each blade as a function of the azimuthal position (θ) of each blade and the at least one signal indicative of wind speed (v) includes the use of a cyclic function, where an amplitude of the cyclic function is calculated using the at least one function dependent on the at least one signal indicative of wind speed (v).

The proposed control method, as it has been mentioned above, may be carried out with the aim of preventing collisions between the blade and the tower, or in order to reduce extreme loads in the event of variations in wind shear profile. Depending on the aim, the range of azimuthal positions in which the blade pitch angle control term (Δβ) assumes positive values differs.

Thus, to ensure protection of the blade prior to reaching the area where it passes in front of the tower, the cyclic function for the calculation of the blade pitch angle control term (Δβ) assumes positive values when the azimuthal position (θ) of the blade is comprised within 90° and 270°, and preferably reaches maximum amplitude (A) when the azimuthal position (θ) of the blade is lower than or equal to 180°.

Furthermore, and to ensure protection of the blade when passing through the area in front of the tower, the cyclic function reaches maximum amplitude (A) when the azimuthal position (θ) of the blade is greater than 180°. This is due to the fact that depending on the elastic properties of the blade, the position of maximum deflection and minimum distance from the tower is reached in one position or in the other. In this embodiment, the minimum distance is reached once the blade (root) has passed the azimuthal position coinciding with the location of the tower (180°). In this example of an embodiment, the cyclic function preferably reaches maximum amplitude (A) when the azimuthal position (θ) of the blade is greater than 190° and lower than 230°.

Figure 9:
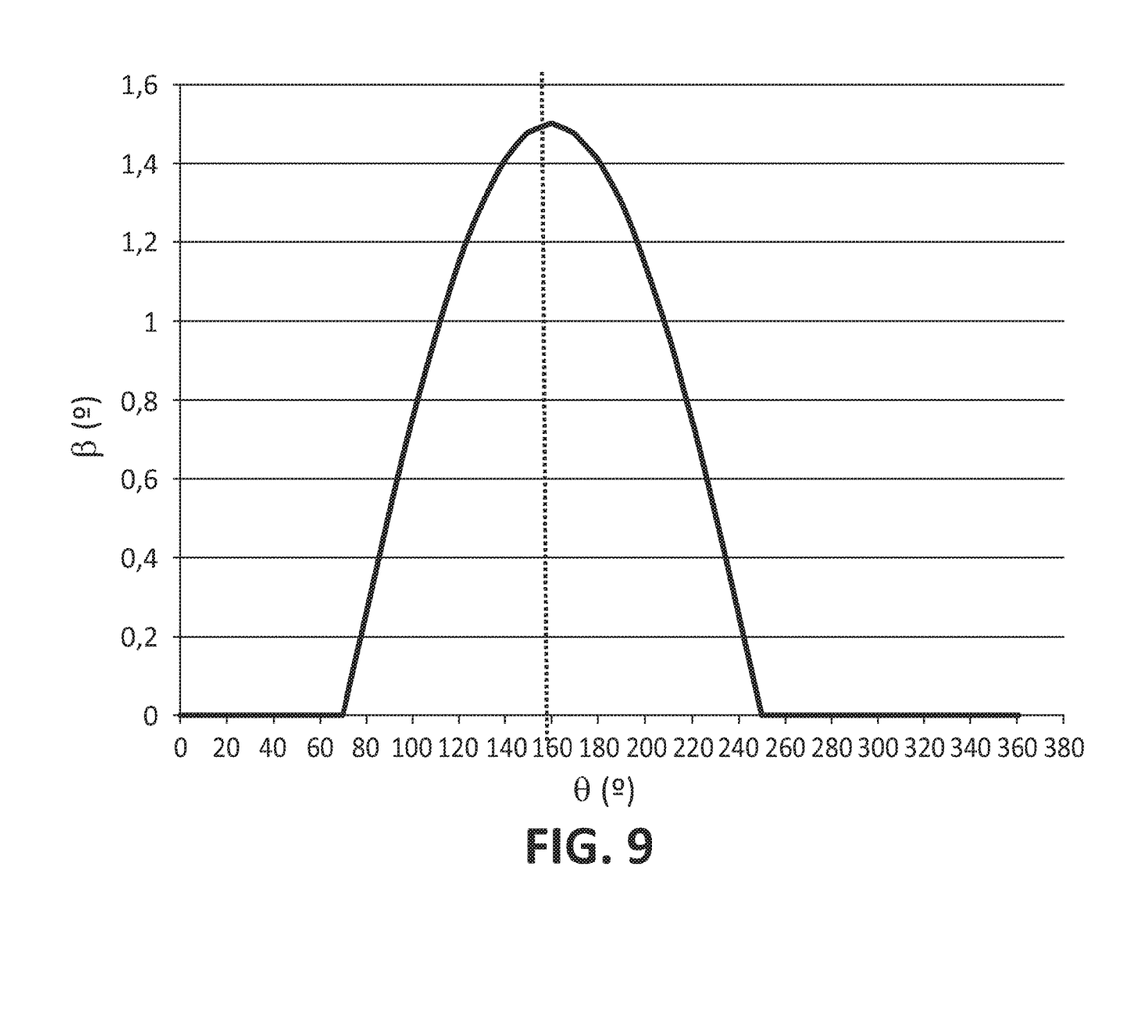
FIG. 9 shows a graph on which the maximum value of the blade pitch angle control term is achieved prior to reaching an azimuthal position coincident with a region close to the tower.

In another example of an embodiment, which may be seen in FIG. 9, in an example of an embodiment, the maximum amplitude (A) is reached when the azimuthal position (θ) of the blade is greater than 150° and fewer than 170°. That is to say, the maximum amplitude of the control function is attained prior to reaching the azimuthal position coinciding with the region closest to the tower.

Figure 10:
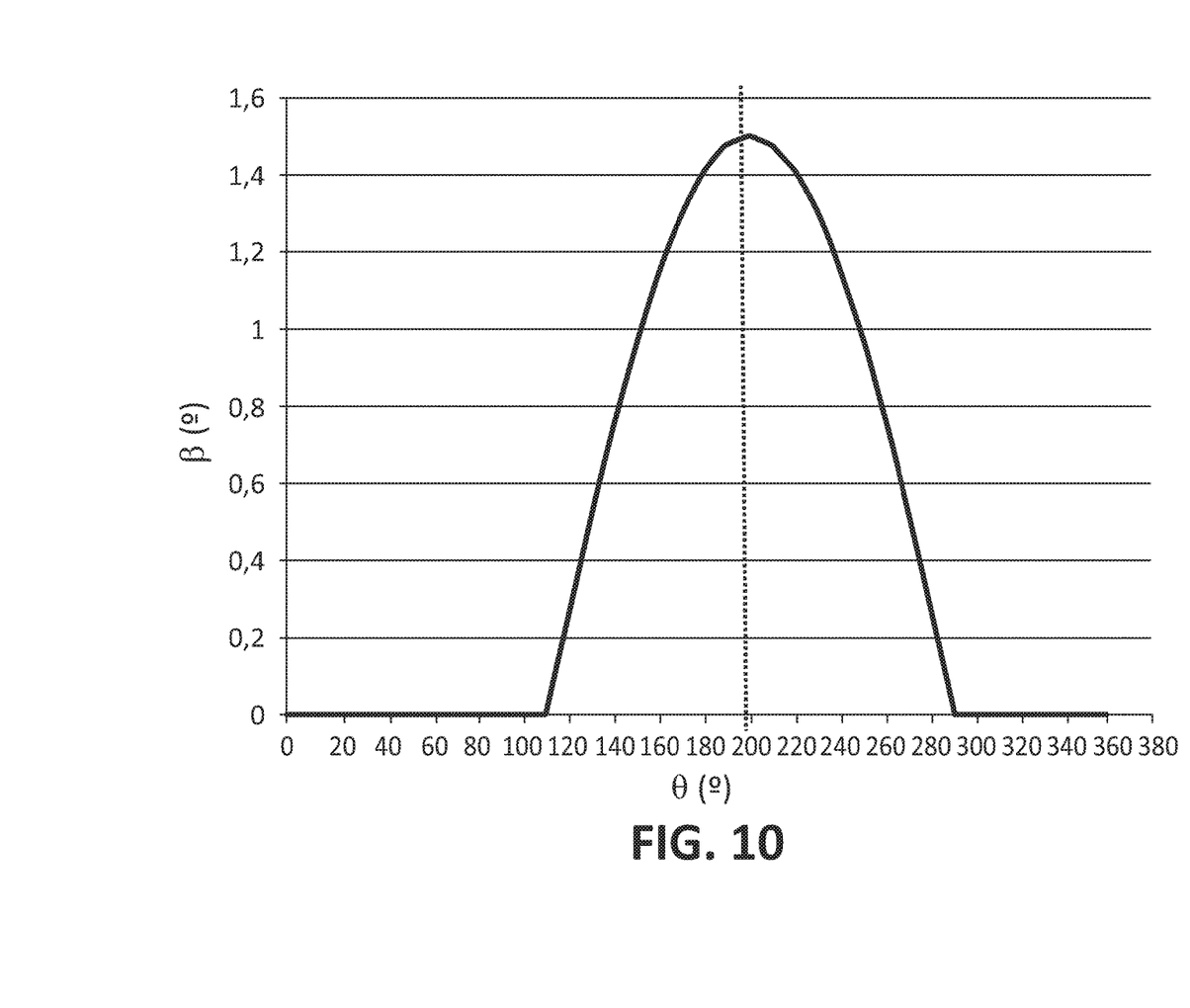
FIG. 10 shows a graph on which the maximum value of the blade pitch angle control term is achieved at an azimuthal position posterior to the region of the tower.
Figure 11:
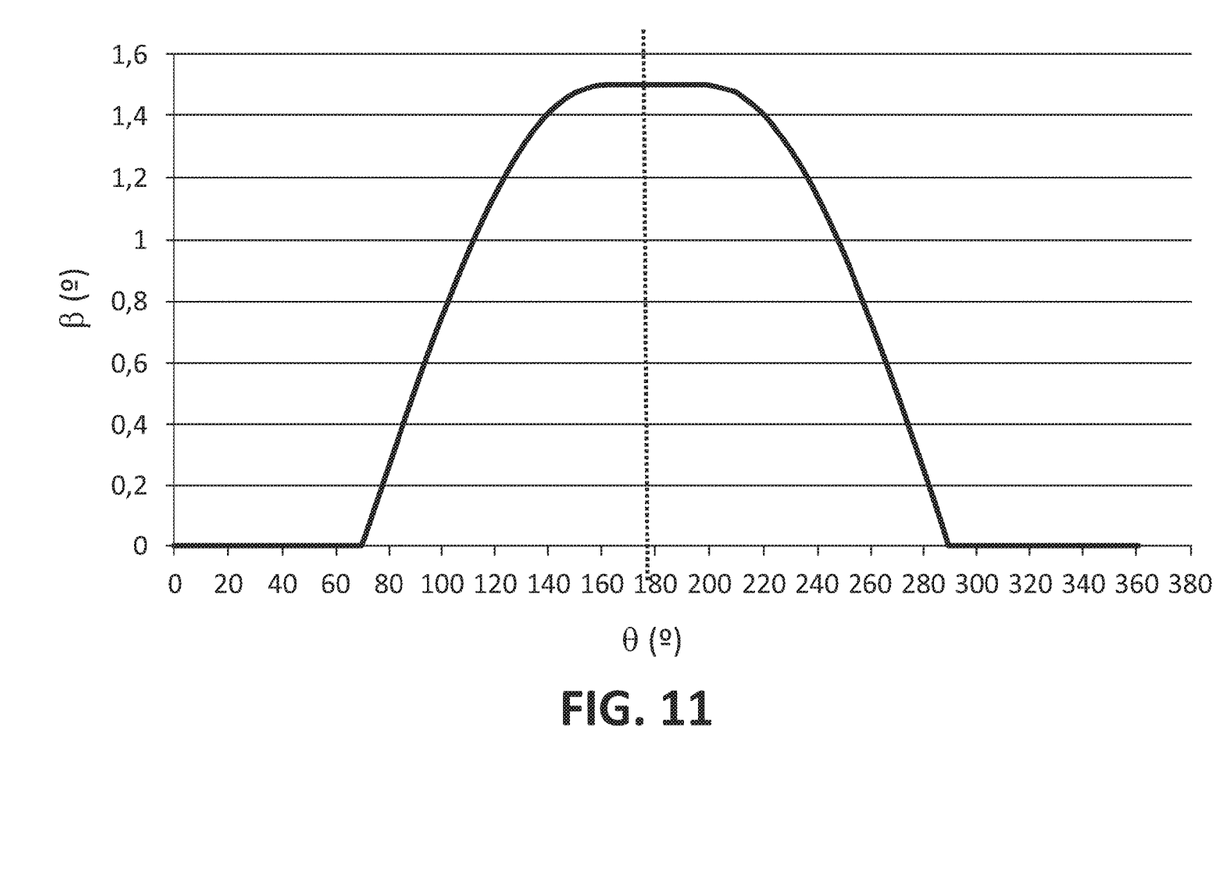
FIG. 11 shows a graph on which the maximum value of the blade pitch angle control term is maintained throughout the area of influence of the tower in order to be protected against variations in wind speed.

In another embodiment, shown in FIG. 10, and in order to guarantee protection of the blade prior to reaching the region where it passes by the tower, the function for the calculation of the blade pitch angle control term (Δβ) maintains the amplitude (A) substantially constant and equal to the maximum amplitude as far as an azimuthal position (θ) of the blade greater than 180°. Thus, the maximum value is maintained throughout the area of influence of the tower in order to be protected against variations in wind speed. In a still more preferred embodiment, the function for calculating the blade pitch angle control term (Δβ) maintains the amplitude (A) substantially constant and equal to the maximum amplitude as far as an azimuthal position (θ) of the blade comprised within 190° and 210°.

The aforementioned ranges of azimuthal positions where the blade pitch angle control term (Δβ) assumes positive values is also advantageous in that the wind turbine is protected against possible reversals of wind shear profile (wind speed profile assumes greater wind speed in regimes closer to ground level than in regimes further away from the same, contrary to normal expectations, where due to the effect of irregularities in the terrain, wind speed is lower close to the ground than at higher levels).

In the event that the sole purpose is the prevention of collisions between blade and tower, or protecting the wind turbine against possible reversals of wind shear profile, the cyclic function has null amplitude (A) within a range of azimuthal positions (θ) of the blade comprised within 270° and 90° in order to reduce the loss of production.

However, in the event that the aim is to reduce extreme loads in the event of sudden increases in the wind shear profile (in addition to preventing collisions between blade and tower, or protecting the wind turbine against possible reversals of wind shear profile, or exclusively), the cyclic function used for the calculation of the blade pitch angle control term (Δβ) assumes positive values when the azimuthal position (θ) of the blade is comprised within 270° and 90°, and preferably reaches maximum amplitude (A) when the azimuthal position (θ) of the blade is substantially equal to 360°.

In one example of an embodiment, the cyclic function is a sine function. In another example of an embodiment, the cyclic function is a trapezoidal function.

The invention claimed is:

1. A control method for a wind turbine of the type comprising at least:
   a tower,
   a rotor with a plurality of blades, each comprising respective actuators, configured to modify the blade pitch angle of each blade, and
   a control unit,
wherein the method comprises the following steps:
   obtaining a first signal regarding the azimuthal position for each blade,
   obtaining at least one signal indicative of wind speed,
   calculating a blade pitch angle control term for each blade as a function of the azimuthal position of each blade and as a function of at least one signal indicative of wind speed, for the purpose of increasing the blade pitch angle,
wherein the step of calculating the blade pitch angle control term comprises the use of the at least one function dependent on the at least one signal indicative of wind speed, and the at least one function dependent on the at least one signal indicative of wind speed includes an increasing piece within a range of wind speed values below a nominal wind speed.

2. The control method of claim 1, wherein the at least one function dependent on the at least one signal indicative of wind speed includes a decreasing piece within a range of wind values above a nominal wind speed.

3. The control method of claim 2, wherein the at least one signal indicative of wind speed comprises a filtered wind measurement.

4. The control method of claim 1, wherein the at least one signal indicative of wind speed comprises a measurement of the generated power.

5. The control method of claim 4, wherein it comprises the steps of:
   obtaining the measurement of the generated power,
   establishing a first value of generated power and a second value of generated power, wherein the second value of generated power is lower than the nominal power and the first value of generated power is lower than the second value of generated power,
   calculating the blade pitch angle control term using the at least one function dependent on the at least one signal indicative of wind speed, using the measurement of generated power as the signal indicative of the wind,
and wherein the increasing piece of the at least one function dependent on the at least one signal indicative of wind speed is comprised within the first value of generated power and the second value of generated power.

6. The control method of claim 5, wherein the first value of generated power is 0.65 pu and the second value of generated power is 0.8 pu.

7. The control method of claim 1, wherein the at least one signal indicative of wind speed comprises a measurement of blade pitch angle.

8. The control method of claim 7, wherein it comprises the steps of:
   obtaining the measurement of the blade pitch angle,
   establishing a minimum blade pitch angle, a first safety value and a second safety value,
   calculating the blade pitch angle control term, using the at least one function dependent on the at least one signal indicative of wind speed, using the measurement of the blade pitch angle as the signal indicative of the wind;
   and wherein the at least one function dependent on the at least one signal indicative of wind speed comprises a decreasing piece within a range of blade pitch angle values, comprised within the minimum blade pitch angle plus the first safety value and the blade minimum pitch angle plus the second safety value.

9. The control method of claim 1, wherein the step of calculating the blade pitch angle control term for each blade as a function of the azimuthal position of each blade and to the at least one signal indicative of wind speed comprises the use of a cyclic function, wherein an amplitude of the cyclic function is calculated using the at least one function dependent on the at least one signal indicative of wind speed.

10. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function reaches its maximum amplitude when the azimuthal position of the blade is greater than 180°.

11. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function reaches its maximum amplitude when the azimuthal position of the blade is greater than 150° and lower than 170°.

12. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function maintains the amplitude substantially constant and equal to the maximum amplitude as far as an azimuthal position of the blade greater than 180°.

13. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function maintains the amplitude substantially constant and equal to the maximum amplitude as far as an azimuthal position of the blade comprised within 190° and 210°.

14. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function has a null amplitude within a range of azimuthal positions of the blade comprised within 270° and 90°.

15. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function is a trapezoidal function.

16. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and in that the range of azimuthal positions in which the blade pitch angle control term is non-null is dependent on the amplitude calculated using the at least one function dependent on the at least one signal indicative of wind speed.

17. The control method of claim 1, wherein it comprises the steps of:
obtaining the measurement of generated power
establishing a first value of generated power and a second value of generated power, wherein the second value of generated power is lower than the nominal power, and the first value of generated power is lower than the second value of generated power,
calculating the blade pitch angle control term, using the at least one function dependent on the at least one signal indicative of wind speed using the measurement of generated power as the signal indicative of the wind and wherein the increasing piece of the at least one function dependent on the at least one signal indicative of wind speed is comprised within the first value of generated power and the second value of generated power,
and wherein the step of calculating the blade pitch angle control term, using the at least one function dependent on the at least one signal indicative of wind speed, is performed using the measurement of the blade pitch angle as the signal indicative of the wind when the signal indicative of wind speed is within the range of wind speed values above the nominal wind speed and is performed using the measurement of generated power as the signal indicative of wind speed, when the signal indicative of wind speed is within the range of wind speed values below the nominal wind speed.

18. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function reaches its maximum amplitude when the azimuthal position of the blade is lower than 180°.

19. The control method of claim 1, wherein the step of calculating the blade pitch angle control term for each blade as a function of the azimuthal position of each blade and as a function of the at least one signal indicative of wind speed comprises the use of a cyclic function, wherein an amplitude of the cyclic function is calculated using the at least one function dependent on the at least one signal indicative of wind speed and the cyclic function reaches its maximum amplitude when the azimuthal position of the blade is greater than 190° and lower than 230°.

20. The control method of claim 1, wherein the step of calculating the blade pitch angle control term for each blade according to the azimuthal position of each blade and to the at least one signal indicative of wind speed comprises the use of a cyclic function, wherein an amplitude of the cyclic function is calculated using the at least one function dependent on the at least one signal indicative of wind speed and the cyclic function is a sine function.

* * * * *